(12) United States Patent
Rane et al.

(10) Patent No.: US 10,356,056 B2
(45) Date of Patent: Jul. 16, 2019

(54) METHOD AND SYSTEM FOR PRIVACY-PRESERVING ORDER STATISTICS IN A STAR NETWORK

(71) Applicant: Palo Alto Research Center Incorporated, Palo Alto, CA (US)

(72) Inventors: Shantanu Rane, Menlo Park, CA (US); Alejandro E. Brito, Mountain View, CA (US); Vanishree Hanumantha Rao, Mountain View, CA (US); Ersin Uzun, Campbell, CA (US); Vincent C. Bindschadler, Urbana, IL (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 327 days.

(21) Appl. No.: 15/457,820

(22) Filed: Mar. 13, 2017

(65) Prior Publication Data

US 2018/0262469 A1    Sep. 13, 2018

(51) Int. Cl.
*G06F 7/00* (2006.01)
*H04W 12/02* (2009.01)
(Continued)

(52) U.S. Cl.
CPC ...... *H04L 63/0428* (2013.01); *G06F 21/6263* (2013.01); *H04L 9/008* (2013.01);
(Continued)

(58) Field of Classification Search
CPC ........... G06F 7/00; H04L 63/04; H04W 12/02
See application file for complete search history.

(56) References Cited

U.S. PATENT DOCUMENTS

2011/0200185 A1* 8/2011 Ghouti ................ H04L 9/3066
                                                                         380/28
2014/0105385 A1    4/2014 Rane et al.
(Continued)

OTHER PUBLICATIONS

Morohashi et al., "Secure Multiparty Computation for Comparator Networks", IEICE Transactions on Fundamentals of Electronics, Communications and Computer Sciences, Engineering Sciences Society, Tokyo, JP, vol. E91A, No. 9, Sep. 1, 2008, pp. 2349-2355, XP001515853, ISSN: 0916-8508, DOI: 10.1093/IETFEC/E91-A9. 2349 *Abstract* *Section 2.1, 2.3, 3.1, 3.2*.
(Continued)

*Primary Examiner* — Joseph P Hirl
*Assistant Examiner* — Kalish K Bell
(74) *Attorney, Agent, or Firm* — Shun Yao; Park, Vaughan, Fleming & Dowler LLP (57) ABSTRACT

One embodiment provides a system that facilitates privacy-preserving order statistics. The system receives, by a first device from a second device, a second value associated with the second device perturbed by a random value. The system determines a first difference between a first value associated with the first device, and the second value. The system encrypts a second difference between the first difference and the random value. Subsequent to transmitting the encrypted second difference, the system receives a sign of a first integer and a ciphertext. The system decrypts the ciphertext to obtain a third value which indicates the first difference scaled based on the first integer, wherein the scaled first difference is perturbed by a second integer. The system determines, based on the sign of the first integer and a sign of the third value, whether the first value is greater than or less than the second value.

20 Claims, 7 Drawing Sheets

(51) Int. Cl.
| | |
|---|---|
| H04L 29/06 | (2006.01) |
| H04L 9/00 | (2006.01) |
| H04L 9/06 | (2006.01) |
| H04L 9/14 | (2006.01) |
| H04L 9/30 | (2006.01) |
| G06F 21/62 | (2013.01) |
| G06Q 30/06 | (2012.01) |

(52) U.S. Cl.
CPC .............. *H04L 9/0618* (2013.01); *H04L 9/14* (2013.01); *H04L 9/30* (2013.01); *G06Q 30/0633* (2013.01)

(56) References Cited

U.S. PATENT DOCUMENTS

2015/0371059 A1\* 12/2015 Bilogrevic .......... G06F 21/6245 726/26
2017/0324712 A1\* 11/2017 Kenthapadi ......... G06F 21/6254

OTHER PUBLICATIONS

Rane et al., "Privacy-Preserving Nearest Neighbor Methods: Comparing Signals Without Revealing Them", IEEE 'Signal Processing Magazine, IEEE Service Center, Piscataway, NJ, US, vol. 30, No. 2, Mar. 1, 2013, pp. 18-28. XP011505541, ISSN: 1053-5888, DOI: 10.1109/MSP.2012.2230221 *The Whole Document*.

Hsiao-Ying Lin et al., "An Efficient Solution to the Millionaires' Problem Based on Homomorphic Encryption", May 19, 2005, Applied Cryptography and Network Security; [Lecture Notes in Computer Science;; LNCS], Springer-Verlag, Berlin/Heidelberg, pp. 456-466, XP019010620, ISBN: 978-3-540-26223-7 *The Whole Document*.

Andrew C Yao et al., "Protocols for Secure Computations", Foundations of Computer Science, 1982. SFCS '08. 23rd 4nnual Symposium On, IEEE, Piscataway, NJ, USA, Nov. 3, 1982, pp. 160-164, XP031288185, *The Whole Document*.

Rane et al., "Privacy, Efficiency & Fault Tolerance in Aggregate Computations on Massive Star Networks", 2015 IEEE International Workshop on Information Forensics and Security (WIFS), IEEE, Nov. 16, 2015, pp. 1-6, XP032840479, DOI: 10.1109/WIFS.2015. 7368608 *The Whole Document*.

\* cited by examiner

FIG. 1

| | Sign (A) | Sign ($Ae_{ij}$ + B) | | Sign ($e_{ij}$) | | Conclusion |
|---|---|---|---|---|---|---|
| 202 | | | | | | |
| 210 | positive | positive | ⇒ | positive | ⇒ | $d_i > d_j$ |
| 212 | positive | negative | ⇒ | negative | ⇒ | $d_i < d_j$ |
| 214 | negative | negative | ⇒ | positive | ⇒ | $d_i > d_j$ |
| 216 | negative | positive | ⇒ | negative | ⇒ | $d_i < d_j$ |

TABLE 200

METHOD AND SYSTEM FOR PRIVACY-PRESERVING ORDER STATISTICS IN A STAR NETWORK

BACKGROUND

Field

This disclosure is generally related to the discovery of order statistics. More specifically, this disclosure is related to privacy-preserving order statistics in a star network.

Related Art

The proliferation of the Internet and e-commerce continues to create a vast amount of digital content from a large number of devices. Individual users may generate sensitive data from devices such as wearable computers, smartphones, and Internet of Things (IoT) home devices, and the sensitive data may be processed or handled by a central entity or service provider (e.g., Strava and FitBit). An individual user may wish to, via the central entity, determine a rank or ordering with respect to other users, without revealing the individual user's sensitive data to the other users or the central entity. For example, in an application like Strava, an individual user may wish to know his relative order or ranking in a group of users based on time over a certain cycling route or road segment, without revealing to the other users or the central entity the individual user's underlying data of, e.g., the user's time to complete the segment.

All of the users and the central entity are untrusted entities. The main privacy constraint in interactions between untrusted entities is that the data held by any individual user should not be revealed to any other user or the central entity. However, the user may still wish for his data to be compared in a privacy-preserving manner in order to obtain a ranking relative to other users. Furthermore, given a star network topology, users do not communicate with each other directly. Users may only communicate with each other via the central entity.

While each user can use his own secret key to obfuscate or encrypt his data, this is made difficult by the fact that each user must also be able to compare his data value with the data value held by other users, who have their own unique secret keys. A protocol to facilitate private-preserving order statistics in a star network does not currently exist.

SUMMARY

One embodiment provides a system that facilitates privacy-preserving order statistics in a network. During operation, the system receives, by a first device of the network from a second device of the network via a central entity, a second value associated with the second device perturbed by a random value generated by the second device, wherein the first device is associated with a first value. The system determines a first difference between the first value and the second value. The system encrypts, based on a public key of the first device, a second difference between the first difference and the random value. Subsequent to transmitting, to the second device via the central entity, the encrypted second difference, the system receives, from the second device via the central entity, a sign of a first integer and a ciphertext. The system decrypts the ciphertext to obtain a third value which indicates the first difference scaled based on the first integer, wherein the scaled first difference is perturbed by a second integer. The system determines, based on the sign of the first integer and a sign of the third value, whether the first value is greater than or less than the second value, thereby enabling devices in the network to determine a relative order of the device value as compared to one or more other device values in the network without revealing any device values.

In some embodiments, the public key of the first device is based on an additively homomorphic cryptosystem.

In some embodiments, an absolute value of the second integer is less than an absolute value of the first integer.

In some embodiments, the ciphertext is encrypted based on the public key of the first device, and decrypting the ciphertext is based on a private key of the first device.

In some embodiments, determining whether the first value is greater than or less than the second value further comprises: in response to determining that the sign of the first integer is positive and the sign of the third value is positive, determining that the first value is greater than the second value; in response to determining that the sign of the first integer is positive and the sign of the third value is negative, determining that the first value is less than the second value; in response to determining that the sign of the first integer is negative and the sign of the third value is negative, determining that the first value is greater than the second value; and in response to determining that the sign of the first integer is negative and the sign of the third value is positive, determining that the first value is less than the second value.

In some embodiments, the sign of the first integer is encrypted based on the public key of the first device, and the system decrypts the encrypted sign of the first integer to obtain the sign of the first integer.

In some embodiments, the second integer has a value of zero, and in response to determining that the third value is zero, the system determines that the first value is equal to the second value.

Another embodiment facilitates privacy-preserving order statistics in a network. During operation, the system receives, from a first device of the network by a second device of the network via a central entity, wherein the first device is associated with a first value and the second device is associated with a second value, a first ciphertext which indicates a first difference between the first value and the second value, wherein the first difference is perturbed by a random value generated by the second device. The system selects a first integer and a second integer, wherein an absolute value of the second integer is less than an absolute value of the first integer. The system generates, based on an additive homomorphic property, a second ciphertext which indicates a third value that is the first difference scaled based on the first integer, wherein the scaled first difference is perturbed by the second integer, wherein the first ciphertext and the second ciphertext are encrypted based on a public key of the first device. The system transmits, to the first device via the central entity, the second ciphertext and a sign of the first integer, which allows the first device to determine, based on the sign of the first integer and a sign of the third value, whether the first value is greater than or less than the second value, thereby enabling devices in the network to determine a relative order of the device value as compared to one or more other device values in the network without revealing any device values.

In some embodiments, the system determines a third ciphertext which indicates the first difference. The system determines a fourth ciphertext which indicates the second integer. The system calculates a product of the fourth ciphertext and the third ciphertext raised to the first integer, wherein the third ciphertext and the fourth ciphertext are encrypted based on the second key, and wherein the calculated product is the second ciphertext.

In some embodiments, prior to transmitting the sign of the first integer, the system encrypts, by the second device, the sign of the first integer based on the public key of the first device, and the system decrypts, by the first device, the encrypted sign of the first integer to obtain the sign of the first integer.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of preserving the privacy of user data in a star network, while determining an ordering or ranking of a user's data value against the data value of other users, via a central entity. The system is based on a homomorphic cryptosystem which allows computations to be carried out on ciphertext. The system can thus generate an encrypted result which, when decrypted, provides information regarding the underlying data, while ensuring the confidentiality of the processed and underlying data.

A large number of users or user devices in a star network can generate data. Users in the star network are only coupled to a central entity, and not with each other. Typically, a common key of a homomorphic cryptosystem can be used to obtain the target value of interest without decrypting individual data. However, in a star network, each participant uses its own key for encryption. As a result, the encrypted data received by the central entity does not have a common key. If the central entity distributes a common key to the participants, the data from individual users becomes exposed to the central entity.

To solve this problem, embodiments of the present invention facilitate privacy-preserving order statistics in a star network. The central entity can be a service provider which collects obfuscated or encrypted data of the users, and acts as an intermediary in subsequent protocol communications between the users. In a setup or configuration phase, each individual user can send its data (obfuscated by a random value) to the central entity. For example, a first device can have a first value and a second device can have a second value. During operation of the protocol, the first device can receive, via the central entity, the second device's obfuscated data (i.e., a second value obfuscated by a random value generated by the second device). The first device can determine a first difference between the first value and the second value. The first device can encrypt, based on a public key of the first device, a second difference between the first difference and the random value. The first device can transmit, to the second device via the central entity, the encrypted second difference.

The second device can receive the encrypted second difference, and can select a first integer and a second integer, where the absolute value of the second integer is less than the absolute value of the first integer. Based on an additive homomorphic property, the second device can generate a ciphertext which indicates a third value that is the first difference scaled based on the first integer, where the scaled first difference is perturbed by the second integer. The ciphertext is encrypted based on the public key of the first device. The second device transmits, to the first device via the central entity, the ciphertext, along with the sign of the first integer (which is used to scale the first difference).

The first device receives the ciphertext and the sign of the first integer. The first device decrypts the ciphertext, based on a private key of the first device, to obtain the third value, which indicates the first difference scaled based on the first integer, where the scaled first difference is perturbed by the second integer. The first device can then determine, based only on the sign of the first integer and the sign of the third value, whether the first value is greater than or less than the second value (e.g., the relative order). The protocol is detailed below in relation to FIG. 1, and determining the relative order is described below in relation to FIG. 2.

Thus, embodiments of the present invention provide a system which improves privacy-preserving order statistics in a star network, where the improvements are fundamentally technological. The system provides a technological solution (e.g., using a protocol based on a homomorphic cryptosystem which allows uncoupled and untrusted users to exchange information via a central entity regarding the users' sensitive data) to the technological problem of efficiently and effectively determining a relative order of the users' data values while preserving the underlying data in a star network.

Exemplary Network and Communication

Assume that there are m user devices or participants communicating with each other via a central entity in a star network topology. Each user device or participant $P_i$ is associated with data $d_i$, where i={1, 2, ..., m}. Assume that $d_i$ is an integer in the interval $[d_{min}, d_{max}]$, where the maximum of the absolute value of each of $d_{min}$ and $d_{max}$ is $N/2$, where $N$ is a large integer. Negative values may be represented as a member of the finite alphabet $\{0, 1, \ldots, N-1\}$, e.g., "$(d_{neg}+N) \mod N$." Thus, the largest positive data value that can be represented is $d_{pos}=N/2-1$, while the smallest negative data value permissible is $d_{neg}=-N/2$. Each user $P_i$ can thus discover a ranking $s_i$, which means that $(s_i-1)$ users have data values that are less than or equal to $d_i$, while $(m-s_i)$ users have data values that are greater than or equal to $d_i$. In the following, the notation "E (x, y)" indicates an encryption of content y based on a key x.

During a setup or configuration phase, each user $P_i$ can send to the central entity its obfuscated data, which is $d_i+r_i \mod N$, where $P_i$ chooses $r_i$ randomly from the interval $[0, N/2]$. During operation, the protocol for privacy-preserving order statistics proceeds in a pairwise fashion, where each user $P_i$ interacts, in turn, with every other user, $P_j$, where j is not equal to i. The communications for an exemplary pairwise exchange is described below in relation to FIG. 1.

Figure 1:
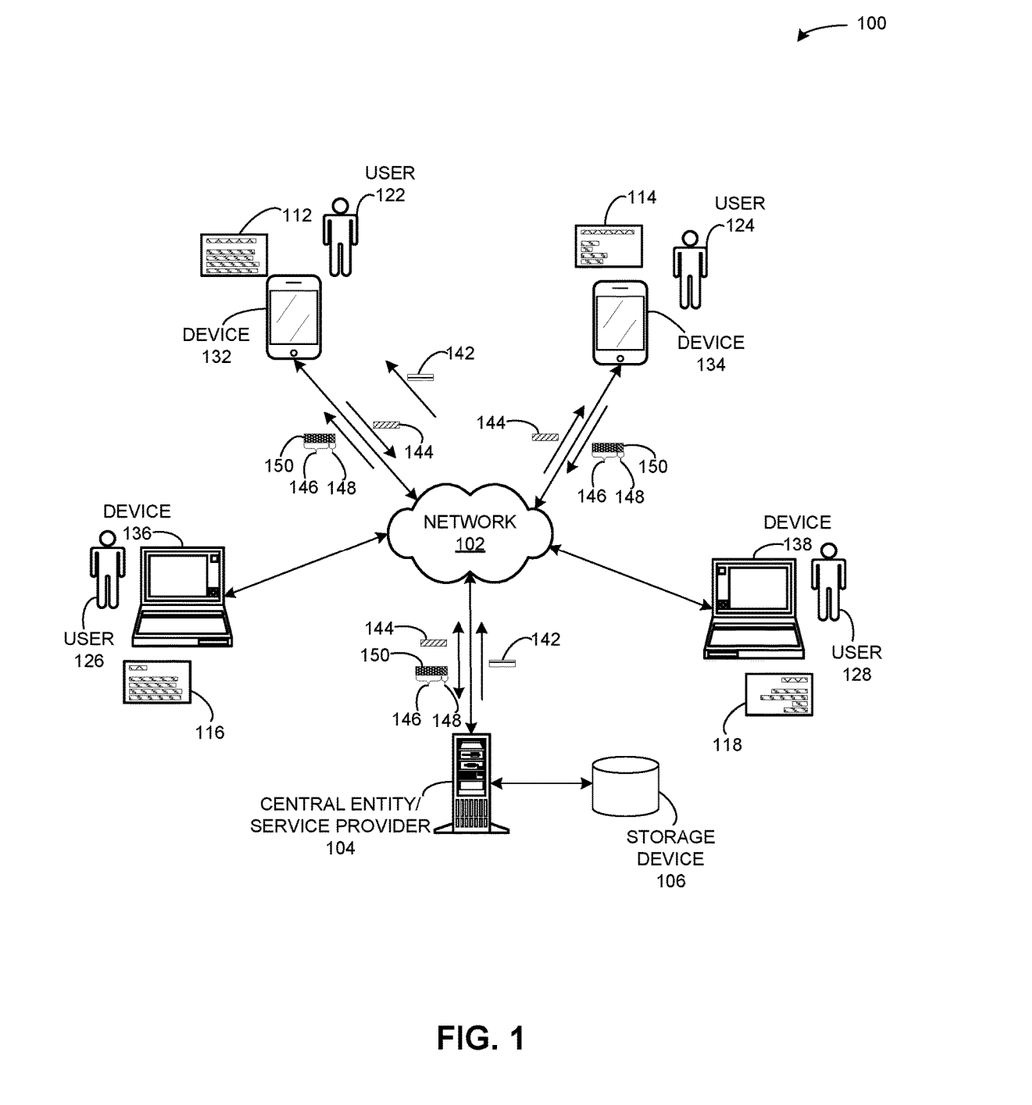
FIG. 1 illustrates an exemplary environment for facilitating privacy-preserving order statistics in a network, in accordance with an embodiment of the present invention.

FIG. 1 illustrates an exemplary environment 100 for facilitating privacy-preserving order statistics in a network, in accordance with an embodiment of the present invention. Environment 100 can include a large number of user devices 132, 134, 136, and 138 coupled to a star network 102. In some embodiments, these user devices are associated with users 122, 124, 126, and 128, respectively. Note that the user data generated from a user device may not depend on a user's interaction with the device (e.g., a smart meter measuring electricity usage at the home of a user). In terms of direct communication, user devices 132, 134, 136, and 138 are only coupled to a central entity 104 and not with each other.

In some embodiments, central entity 104 can operate as a service provider 104, which can collect obfuscated data from each of devices 132, 134, 136, and 138. Service provider 104 can, in conjunction with devices 132, 134, 136, and 138, facilitate privacy-preserving order statistics in star network 102. In environment 100, there are m=4 user devices 132, 134, 136, and 138, which have or hold sensitive data 112, 114, 116, and 118, respectively. Devices 132, 134, 136, and 138 can obfuscate their respective sensitive data by a random value generated by each of devices 132, 134, 136, and 138. Assume that device 132 is $P_i$, device 134 is $P_j$, data 112 of device 132 is $d_i$, and data 114 of device 134 is $d_j$. Device 134 can generate a random value ($r_j$) and send its data 114 ($d_j$) as obfuscated data value 142 ($d_j+r_j$) to service provider 104. $P_i$ has a public key, $v_i$, and a corresponding private key, $w_i$, which are generated for an additively homomorphic cryptosystem.

During operation, each of devices 132, 134, 136, and 138 can interact in a pairwise fashion with each of the other devices. For example, consider the interaction between device 132 ($P_i$) and device 134 ($P_j$). Device 132 ($P_i$) can obtain from service provider 104 obfuscated data value 142 ($d_j+r_j$) associated with device 134 ($P_j$). Device 132, in possession of its own data 112 ($d_i$), can compute $d_i-d_j-r_j \mod N$ as equal to $e_{ij}-r_j \mod N$, where $e_{ij}$ is a first difference between data 112 ($d_i$) and data 114 ($d_j$), and $e_{ij}-r_j$ is a second difference between the first difference and the random value. Device 132 can encrypt the second difference based on the public key, $v_i$, of device 132, to obtain encrypted second difference 144 of $E(v_i, e_{ij}-r_j)$. Device 132 can transmit encrypted second difference 144 to device 134 via service provider 104.

Device 134 ($P_j$) can receive encrypted second difference 144. Device 134 can select a first integer A and a second integer B, where $|B|<|A|<N/2$. Based on the malleability property of additively homomorphic encryption as described above, device 134 can remove the random value or noise term $r_j$ in the encrypted domain, by computing $E(v_i, e_{ij}-r_j) * (v_i, r_j)$ and obtaining $E(v_i, e_{ij})$. Device 134 can perform additive and multiplicative blinding in the encrypted domain, by computing $(E(v_i, e_{ij}))^A * E(v_i, B)$, and obtaining $E(v_i, Ae_{ij}) * E(v_i, B)$, and further obtaining a resultant ciphertext 146 of $E(v_i, Ae_{ij}+B)$. These operations are possible because of the additively homomorphic property of the cryptosystem. Device 134 can then send an object 150 to device 132 via service provider 104, where object 150 includes ciphertext 146 and a sign of A 148.

Device 132 ($P_i$) can receive object 150 which includes ciphertext 146 and sign of A 148, and decrypt ciphertext 146 using the private key, $w_i$, of device 132, to obtain a third value, $Ae_{ij}+B$. The third value has a sign (i.e., positive or negative). Device 132 can now determine, based solely on the sign of A 148 as included in object 150 and the sign of the third value, $Ae_{ij}+B$, whether the value of device 132's data 112 is greater than or less than the value of device 134's data 114 (i.e., whether $d_i$ is greater than or less than $d_j$). Device 132 can subsequently perform this same set of interactions with the remainder of the m−1 devices in environment 100, i.e., device 136 and device 138, to determine device 132's relative ranking with respect to all of the other m−1 devices in environment 100.

Figure 2:
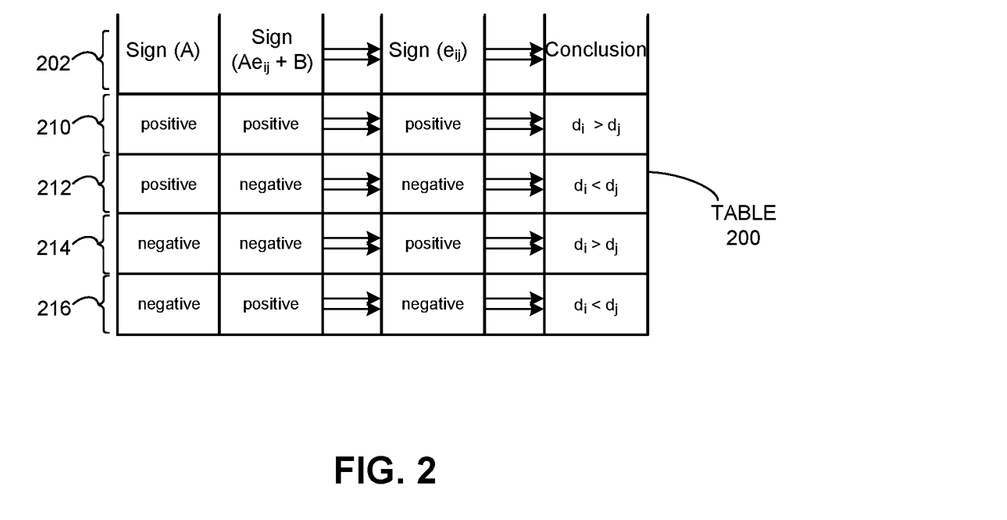
FIG. 2 illustrates an exemplary table depicting whether a first device's value is greater than or less than a second device's value, in accordance with an embodiment of the present invention.

FIG. 2 illustrates an exemplary table 200 depicting whether a first device's value is greater than or less than a second device's value, in accordance with an embodiment of the present invention. The sign of A and the sign of $Ae_{ij}+B$ (i.e., the "third value" discussed above in relation to FIG. 1) indicates the sign of $e_{ij}$ (recalling the condition that $|B|<|A|<N/2$), as shown in a row 202 with corresponding column headers. If the sign of A is positive and the sign of $Ae_{ij}+B$ is positive, then the sign of $e_{ij}$ must be positive, and thus $d_i$ is greater than $d_j$ (as shown in a row 210). If the sign of A is positive and the sign of $Ae_{ij}+B$ is negative, then the sign of $e_{ij}$ must be negative, and thus $d_i$ is less than $d_j$ (as shown in a row 212). If the sign of A is negative and the sign of $Ae_{ij}+B$ is negative, then the sign of $e_{ij}$ must be positive, and thus $d_i$ is greater than $d_j$ (as shown in a row 214). If the sign of A is negative and the sign of $Ae_{ij}+B$ is positive, then the sign of $e_{ij}$ must be negative, and thus $d_i$ is less than $d_j$ (as shown in a row 216).

Correctness; Revealing an Equality of Data

Table 200 of FIG. 2 illustrates the correctness of the protocol. That is, when $e_{ij}$ is equal to a non-zero value, the condition that $|B|<|A|<N/2$ ensures that the protocol preserves the sign of $e_{ij}$. Thus, $P_i$ can determine whether $d_i$ is greater than or less than $d_j$ simply by looking at the sign of A and the sign of $Ae_{ij}+B$.

However, when $e_{ij}$ is equal to zero, the protocol returns an inequality even though $d_i$ is equal to $d_j$. Thus, the protocol may only generate an approximate ranking if some user devices hold values that are equal. An approximate ranking may not be a concern in applications where the number of users is large. This approximate ranking requirement is achieved by the use of the second integer B (which is used to perturb the scaled difference of $e_{ij}$) and is further essential, because without B, an equality of $d_i=d_j$ would be leaked to $P_i$. In some embodiments, this leakage (of the equality of two device values) is not a concern, in which case, the protocol may be modified to allow $P_j$ to deterministically set B equal to zero.

Privacy and Complexity

A semi-honest party is a party that follows the rules of the protocol but in each step of the protocol has the freedom to view the data that it holds (or is holding as an intermediary), and that may attempt to make educated guesses regarding the data held by another party. A semi-honest collusion is a collusion between two semi-honest parties. In the case of the star network of FIG. 1, each of devices 132, 134, 136, and 138, and service provider 104 is a semi-honest party. In the case of the exemplary communication depicted in FIG. 1, device 134 and service provider 104 may attempt to participate in a semi-honest collusion regarding data 112 ($d_i$) of device 132 ($P_i$), or device 132 and service provider 104 may attempt to participate in a semi-honest collusion regarding data 114 ($d_j$) of device 134 ($P_j$).

The protocol of the present invention achieves privacy against both semi-honest parties and semi-honest collusions. The additive blinding performed by $P_j$ (by obfuscating his data $d_j$ with $r_j$) prevents data $d_j$ from being read by any other party, including both $P_i$ and the service provider. The encryption of the second difference between the first difference and the random value (i.e., $e_{ij}-r_j$), based on the public key, $v_i$, of $P_i$, is safe because only $P_i$ possesses the private key, $w_i$, capable of decrypting the encrypted second difference.

Furthermore, if $P_i$ colludes with the service provider, these two parties obtain access only to ($d_j+r_j$) and $Ae_{ij}+B=A(d_i-d_j)+B$. However, in the absence of any knowledge of $r_j$, A, and B, $P_i$ and the central entity cannot discover $d_j$. At the same time, if $P_j$ colludes with the service provider, these two parties obtain access only to $d_i+r_i$, which is not sufficient to reveal $d_i$.

In the setup phase, where each device sends its obfuscated data to the central entity, the protocol does not incur any ciphertext computation. In the protocol interaction phase for each pair of (i, j) users, there is one ciphertext communication from $P_i$ to $P_j$ via the central entity (e.g., encrypted second difference 146), and another ciphertext communication from $P_j$ to $P_i$ via the central entity (e.g., object 150 which includes ciphertext 146 and sign of A 148). Thus, for each $P_i$ who is interested in his ranking, the protocol overhead is linearly proportional to the number of users.

Thus, the complexity of the ciphertext communication of the protocol (e.g., sending 144 and receiving 146, or receiving 144 and sending 146) is O(m). Similarly, the number of encryptions and the number of encrypted-domain computations (e.g., computing 144 and computing 146) is also O(m). If each of the m users is interested in rankings, then the complexity is proportional to the number of pairs, i.e., $O(m^2)$.

Method for Determining a Relative Order while Preserving Privacy

Figure 3A:
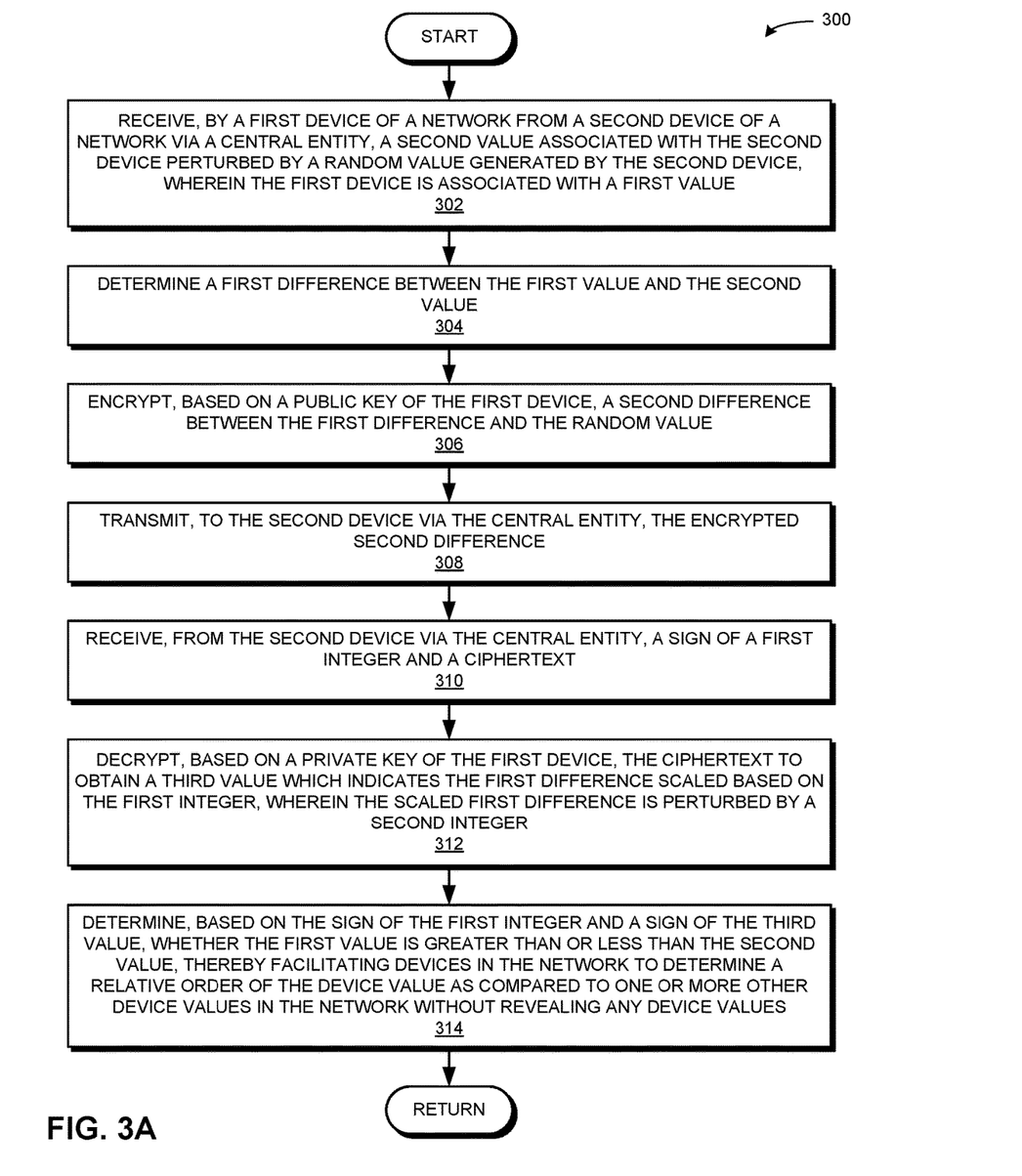
FIG. 3A presents a flow chart illustrating a method by a user device for determining a relative order of the user device value as compared to another user device value, in accordance with an embodiment of the present invention.

FIG. 3A presents a flow chart 300 illustrating a method by a user device for determining a relative order of the user device value as compared to another user device value, in accordance with an embodiment of the present invention. During operation, the system receives, by a first device of a network from a second device of a network via a central entity, a second value associated with the second device perturbed by a random value generated by the second device, wherein the first device is associated with a first value (operation 302). The network can be a star network, or in a star topology where multiple devices (including the first device and the second device) cannot communicate directly with each other, but can only communicate with the central entity.

The first device determines a first difference between the first value and the second value (operation 304). The first device encrypts, based on a public key of the first device, a second difference between the first difference and the random value (operation 306). The first device transmits, to the second device via the central entity, the encrypted second difference (operation 308). The first device receives, from the second device via the central entity, a sign of a first integer and a ciphertext (operation 310). The ciphertext is encrypted based on the public key of the first device. In some embodiments, the sign of the first integer is also encrypted based on the public key of the first device.

The first device decrypts, based on a private key of the first device, the ciphertext to obtain a third value which indicates the first difference scaled based on the first integer, wherein the scaled first difference is perturbed by a second integer (operation 312). The first device determines, based on the sign of the first integer and a sign of the third value, whether the first value is greater than or less than the second value, thereby facilitating devices in the network to determine a relative order of the device value as compared to one or more other device values in the network without revealing any device values (operation 314). In some embodiments, the second integer may have a value of zero, which is set deterministically by the second device, and thus known by the first device and any other devices in the star network. This may occur when leakage of an equality between the first value and the second value (or between any two device values) is not a concern.

Figure 3B:
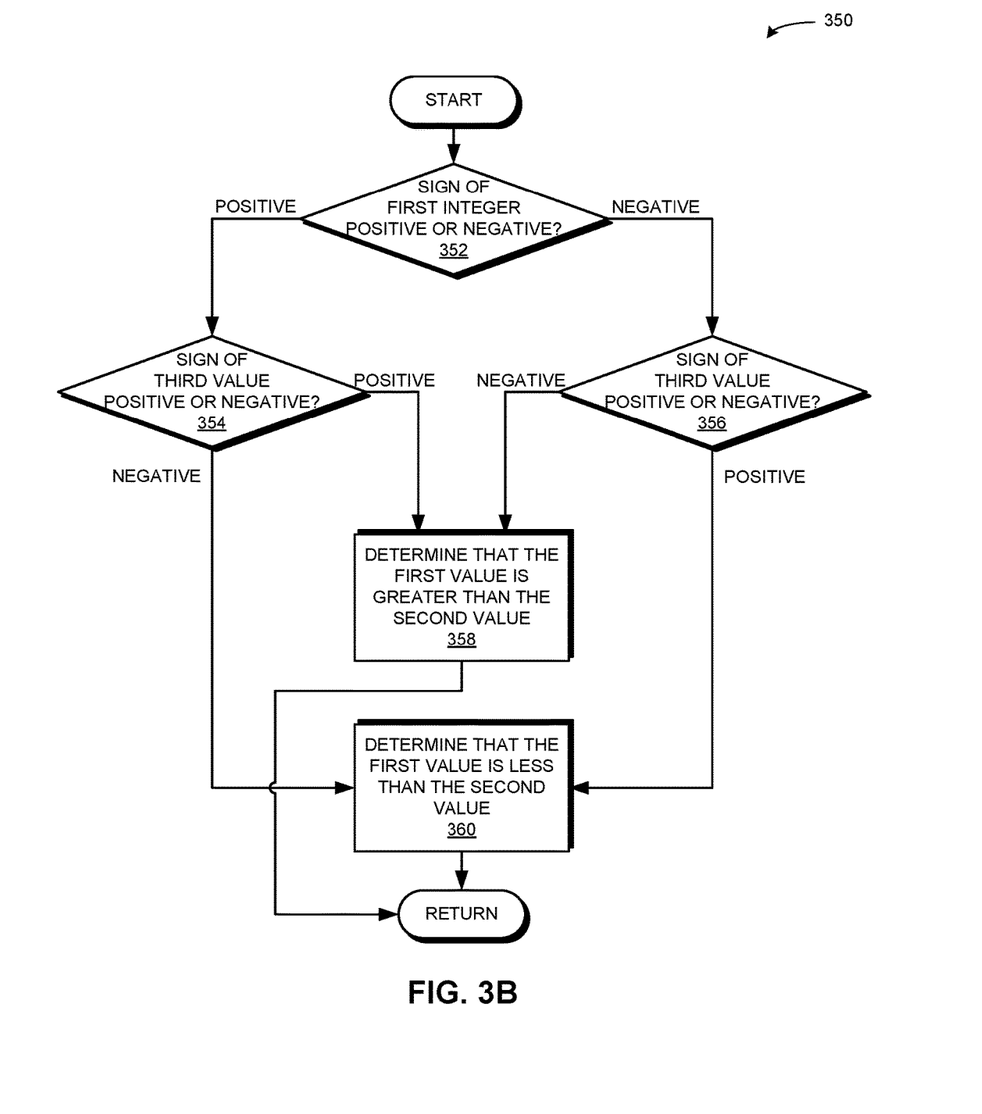
FIG. 3B presents a flow chart illustrating a method by a user device for determining a relative order of the user device value as compared to another user device value, in accordance with an embodiment of the present invention.

FIG. 3B presents a flow chart 350 illustrating a method by a user device for determining a relative order of the user device value as compared to another user device value, in accordance with an embodiment of the present invention. The user device (e.g., the first device of flow chart 300 of FIG. 3A) determines whether the sign of the first integer is positive or negative (decision 352). If the sign of the first integer is positive (decision 352), the first device determines whether the sign of the third value is positive or negative (decision 354). If the sign of the third value is positive (decision 354), the first device determines that the first value is greater than the second value (operation 358), and the operation returns. If the sign of the third value is negative (decision 354), the first device determines that the first value is less than the second value (operation 360), and the operation returns.

If the sign of the first integer is negative (decision 352), the first device determines whether the sign of the third value is positive or negative (decision 356). If the sign of the third value is negative (decision 356), the first device determines that the first value is greater than the second value (operation 358), and the operation returns. If the sign of the third value is positive (decision 356), the first device determines that the first value is less than the second value (operation 360), and the operation returns. Flow chart 350 corresponds to table 200 described above in relation to FIG. 2.

Figure 4A:
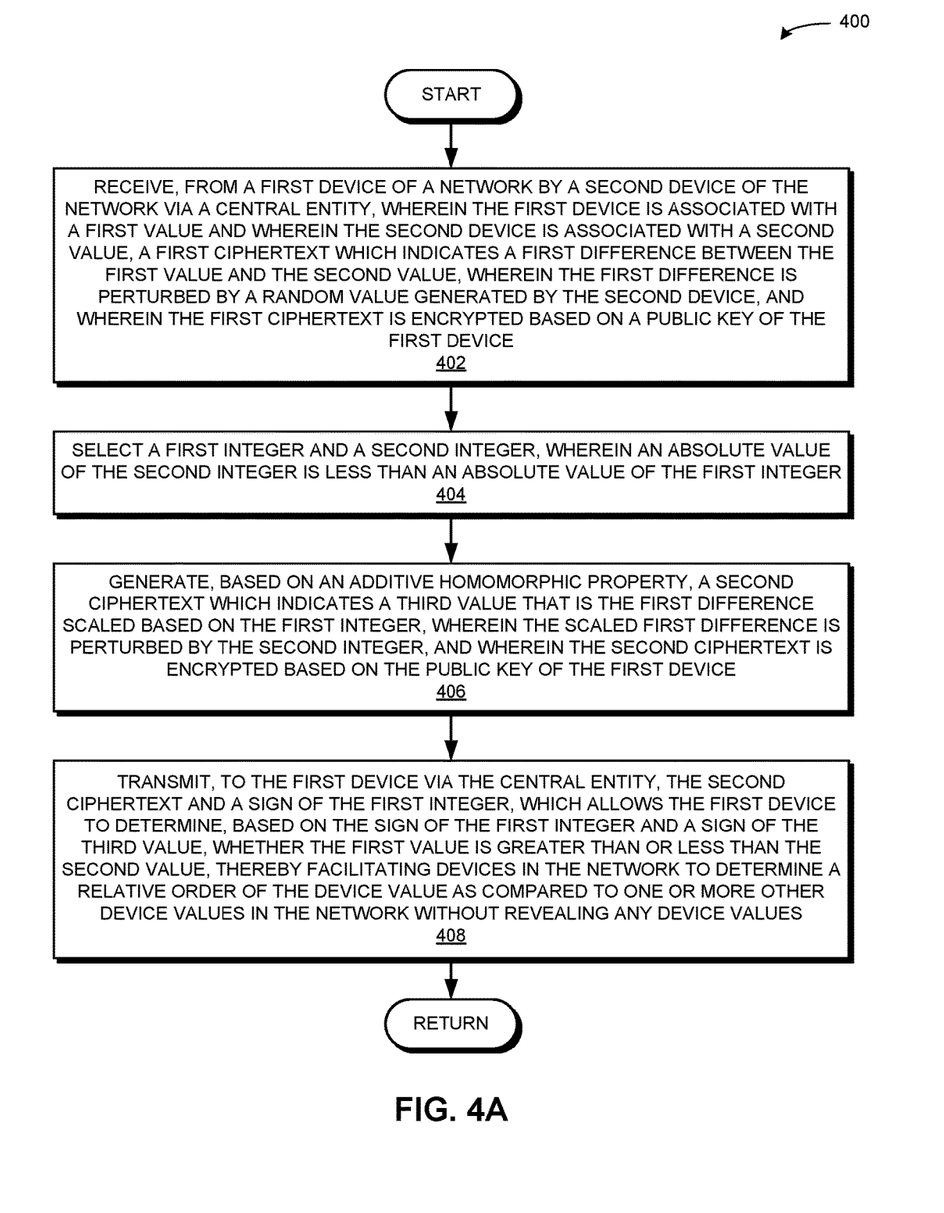
FIG. 4A presents a flow chart illustrating a method by a user device for participating in a protocol which facilitates privacy-preserving order statistics in a network, in accordance with an embodiment of the present invention.

Method for Participating in Protocol to Facilitate Privacy-Preserving Order Statistics FIG. 4A presents a flow chart 400 illustrating a method by a user device for participating in a protocol which facilitates privacy-preserving order statistics in a network, in accordance with an embodiment of the present invention. During operation, the system receives, from a first device of a network by a second device of the network via a central entity, wherein the first device is associated with a first value and the second device is associated with a second value, a first ciphertext which indicates a first difference between the first value and the second value, wherein the first difference is perturbed by a random value generated by the second device, and wherein the first ciphertext is encrypted based on a public key of the first device (operation 402). The second device selects a first integer and a second integer, wherein an absolute value of the second integer is less than an absolute value of the first integer (operation 404). The second device generates, based on an additive homomorphic property, a second ciphertext which indicates a third value that is the first difference scaled based on the first integer, wherein the scaled first difference is perturbed by the second integer, and wherein the second ciphertext is encrypted based on the public key of the first device (operation 406). In some embodiments, the second device deterministically sets the value of the second integer to zero, e.g., a case where leakage of an equality between the first value and the second value (or between any two device values) is not a concern.

The second device transmits, to the first device via the central entity, the second ciphertext and a sign of the first integer, which allows the first device to determine, based on the sign of the first integer and a sign of the third value, whether the first value is greater than or less than the second value, thereby facilitating devices in the network to determine a relative order of the device value as compared to one or more other device values in the network without revealing any device values (operation 408).

Figure 4B:
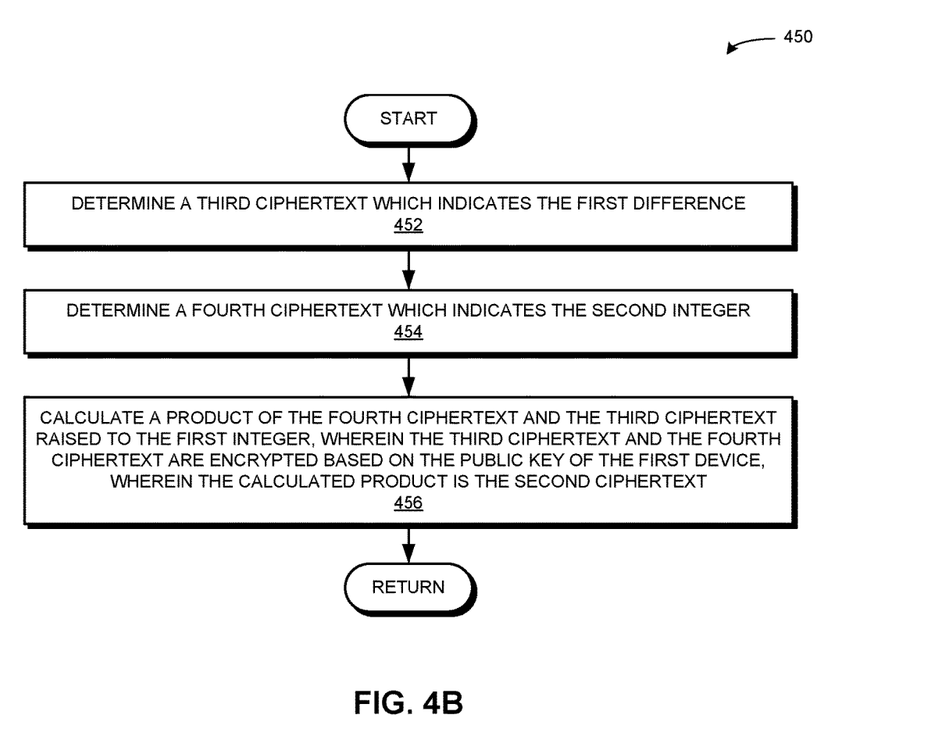
FIG. 4B presents a flow chart illustrating a method by a user device for participating in a protocol which facilitates privacy-preserving order statistics in a network, in accordance with an embodiment of the present invention.

FIG. 4B presents a flow chart illustrating a method by a user device for participating in a protocol which facilitates privacy-preserving order statistics in a network, in accordance with an embodiment of the present invention. The second device is the second device of flow chart 400 of FIG. 4A. During operation, the system determines, by the second device, a third ciphertext which indicates the first difference (operation 452). The second device determines a fourth ciphertext which indicates the second integer (operation 454). The second device calculates a product of the fourth ciphertext and the third ciphertext raised to the first integer, wherein the third ciphertext and the fourth ciphertext are encrypted based on the public key of the first device, and wherein the calculated product is the second ciphertext (operation 456).

Exemplary Computer and Communication System

Figure 5:
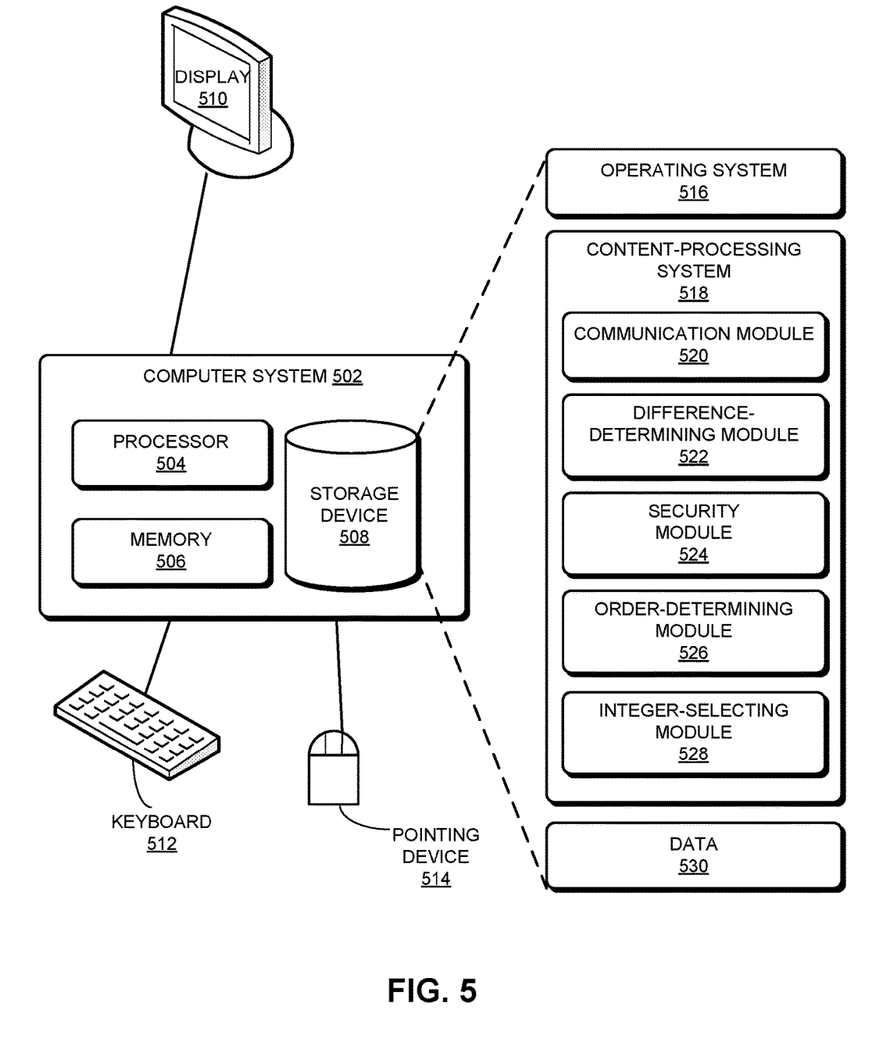
FIG. 5 illustrates an exemplary distributed computer and communication system that facilitates privacy-preserving order statistics in a network, in accordance with an embodiment of the present invention.

FIG. 5 illustrates an exemplary distributed computer and communication system 502 that facilitates privacy-preserving order statistics in a network, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. In some embodiments, computer system 502 can be part of a mobile computing device, such as a smartphone, a mobile phone, a tablet, a three-dimensional viewing glass, or any other mobile computing device. Storage device 508 can store an operating system 516, a content-processing system 518, and data 528.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a star network (communication module 520). A data packet can include a message that indicates ciphertext, data encrypted based on a homomorphic property, or other data.

Content-processing system 518 can include instructions for receiving, by a first device of the network from a second device of the network via a central entity, a second value associated with the second device perturbed by a random value generated by the second device, wherein the first device is associated with a first value (communication module 520). Content-processing system 518 can include instructions for determining a first difference between the first value and the second value (difference-determining module 522). Content-processing system 518 can include instructions for encrypting, based on a public key of the first device, a second difference between the first difference and the random value (security module 524). Content-processing system 518 can include instructions for, subsequent to transmitting the encrypted second difference (communication module 520), receiving a sign of a first integer and a ciphertext (communication module 520). Content-processing system 518 can include instructions for decrypting the ciphertext to obtain a third value which indicates the first difference scaled based on the first integer, wherein the scaled first difference is perturbed by a second integer (security module 524). Content-processing system 518 can include instructions for determining, based on the sign of the first integer and a sign of the third value, whether the first value is greater than or less than the second value (order-determining module 526).

Moreover, content-processing system 518 can include instructions for receiving, from a first device of the network by a second device of the network via a central entity, wherein the first device is associated with a first value and the second device is associated with a second value, a first ciphertext which indicates a first difference between the first value and the second value, wherein the first difference is perturbed by a random value generated by the second device (communication module 520). Content-processing system 518 can include instructions for selecting a first integer and a second integer, wherein an absolute value of the second integer is less than an absolute value of the first integer (integer-selecting module 528). Content-processing system 518 can include instructions for generating, based on an additive homomorphic property, a second ciphertext which indicates a third value that is the first difference scaled based on the first integer, wherein the scaled first difference is perturbed by the second integer, wherein the first ciphertext and the second ciphertext are encrypted based on a public key of the first device (security module 524). Content-processing system 518 can include instructions for transmitting, to the first device via the central entity, the second ciphertext and a sign of the first integer (communication module 520).

Data 530 can include any data that is required as input or that is generated as output by the methods and/or processes described in this disclosure. Specifically, data 530 can store at least: a first value; a second value; a random value; a first difference between the first value and the second value; a public key; a private key; a second difference between the first difference and the random value; a ciphertext; an encrypted second difference; a first integer; a second integer; a sign of the first integer; a third value which indicates the first difference scaled based on the first integer, wherein the scaled first difference is perturbed by the second integer; a sign of the third value; an encrypted sign of the first integer; an encrypted third value; a homomorphic cryptosystem; and an absolute value of an integer.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating privacy-preserving order statistics in a network, the method comprising:
   receiving, by a first device of the network from a second device of the network via a central entity, a second value associated with the second device perturbed by a random value generated by the second device, wherein the first device is associated with a first value;
   determining a first difference between the first value and the second value;
   encrypting, based on a public key of the first device, a second difference between the first difference and the random value;
   subsequent to transmitting, to the second device via the central entity, the encrypted second difference, receiving, from the second device via the central entity, a sign of a first integer and a ciphertext;
   decrypting the ciphertext to obtain a third value which indicates the first difference scaled based on the first integer, wherein the scaled first difference is perturbed by a second integer;
   determining, based on the sign of the first integer and a sign of the third value, whether the first value is greater than or less than the second value,
   thereby facilitating devices in the network to determine a relative order of the device value as compared to one or more other device values in the network without revealing any device values.

2. The method of claim 1, wherein the public key of the first device is based on an additively homomorphic cryptosystem.

3. The method of claim 1, wherein an absolute value of the second integer is less than an absolute value of the first integer.

4. The method of claim 1, wherein the ciphertext is encrypted based on the public key of the first device, and wherein decrypting the ciphertext is based on a private key of the first device.

5. The method of claim 1, wherein determining whether the first value is greater than or less than the second value further comprises:
   in response to determining that the sign of the first integer is positive and the sign of the third value is positive, determining that the first value is greater than the second value;
   in response to determining that the sign of the first integer is positive and the sign of the third value is negative, determining that the first value is less than the second value;
   in response to determining that the sign of the first integer is negative and the sign of the third value is negative, determining that the first value is greater than the second value; and
   in response to determining that the sign of the first integer is negative and the sign of the third value is positive, determining that the first value is less than the second value.

6. The method of claim 1, wherein the sign of the first integer is encrypted based on the public key of the first device, and wherein the method further comprises:
   decrypting the encrypted sign of the first integer to obtain the sign of the first integer.

7. The method of claim 1, wherein the second integer has a value of zero, wherein the method further comprises:
   in response to determining that the third value is zero, determining that the first value is equal to the second value.

8. A computer-implemented method for facilitating privacy-preserving order statistics in a network, the method comprising:
   receiving, from a first device of the network by a second device of the network via a central entity, wherein the first device is associated with a first value and the second device is associated with a second value, a first ciphertext which indicates a first difference between the first value and the second value, wherein the first difference is perturbed by a random value generated by the second device;
   selecting a first integer and a second integer, wherein an absolute value of the second integer is less than an absolute value of the first integer;
   generating, based on an additive homomorphic property, a second ciphertext which indicates a third value that is the first difference scaled based on the first integer, wherein the scaled first difference is perturbed by the second integer,
   wherein the first ciphertext and the second ciphertext are encrypted based on a public key of the first device;
   transmitting, to the first device via the central entity, the second ciphertext and a sign of the first integer, which allows the first device to determine, based on the sign of the first integer and a sign of the third value, whether the first value is greater than or less than the second value,
   thereby facilitating devices in the network to determine a relative order of the device value as compared to one or more other device values in the network without revealing any device values.

9. The method of claim 8, wherein the public key of the first device is based on an additively homomorphic cryptosystem.

10. The method of claim 8, wherein generating the second ciphertext further comprises:
- determining a third ciphertext which indicates the first difference;
- determining a fourth ciphertext which indicates the second integer; and
- calculating a product of the fourth ciphertext and the third ciphertext raised to the first integer, wherein the third ciphertext and the fourth ciphertext are encrypted based on the second key,
- wherein the calculated product is the second ciphertext.

11. The method of claim 8, wherein the second ciphertext is decrypted by the first device based on a private key of the first device.

12. The method of claim 8, wherein the first device determining whether the first value is greater than or less than the second value further comprises:
- in response to determining, by the first device, that the sign of the first integer is positive and the sign of the third value is positive, determining, by the first device, that the first value is greater than the second value;
- in response to determining, by the first device, that the sign of the first integer is positive and the sign of the third value is negative, determining, by the first device, that the first value is less than the second value;
- in response to determining, by the first device, that the sign of the first integer is negative and the sign of the third value is negative, determining, by the first device, that the first value is greater than the second value; and
- in response to determining, by the first device, that the sign of the first integer is positive and the sign of the third value is positive, determining, by the first device, that the first value is less than the second value.

13. The method of claim 8, further comprising:
- prior to transmitting the sign of the first integer, encrypting the sign of the first integer based on the public key of the first device, and
- wherein the method further comprises decrypting, by the first device, the encrypted sign of the first integer to obtain the sign of the first integer.

14. A computer system for facilitating privacy-preserving order statistics in a network, the system comprising:
- a processor; and
- a storage device storing instructions that when executed by the processor cause the processor to perform a method, the method comprising:
  - receiving, by a first device of the network from a second device of the network via a central entity, a second value associated with the second device perturbed by a random value generated by the second device, wherein the first device is associated with a first value;
  - determining a first difference between the first value and the second value;
  - encrypting, based on a public key of the first device, a second difference between the first difference and the random value;
  - subsequent to transmitting, to the second device via the central entity, the encrypted second difference, receiving, from the second device via the central entity, a sign of a first integer and a ciphertext;
  - decrypting the ciphertext to obtain a third value which indicates the first difference scaled based on the first integer, wherein the scaled first difference is perturbed by a second integer;
  - determining, based on the sign of the first integer and a sign of the third value, whether the first value is greater than or less than the second value,
  - thereby facilitating devices in the network to determine a relative order of the device value as compared to one or more other device values in the network without revealing any device values.

15. The computer system of claim 14, wherein the public key of the first device is based on an additively homomorphic cryptosystem.

16. The computer system of claim 14, wherein an absolute value of the second integer is less than an absolute value of the first integer.

17. The computer system of claim 14, wherein the ciphertext is encrypted based on the public key of the first device, and wherein decrypting the ciphertext is based on a private key of the first device.

18. The method of claim 1, wherein determining whether the first value is greater than or less than the second value further comprises:
- in response to determining that the sign of the first integer is positive and the sign of the third value is positive, determining that the first value is greater than the second value;
- in response to determining that the sign of the first integer is positive and the sign of the third value is negative, determining that the first value is less than the second value;
- in response to determining that the sign of the first integer is negative and the sign of the third value is negative, determining that the first value is greater than the second value; and
- in response to determining that the sign of the first integer is negative and the sign of the third value is positive, determining that the first value is less than the second value.

19. The computer system of claim 14, wherein the sign of the first integer is encrypted based on the public key of the first device, and wherein the method further comprises:
- decrypting the encrypted sign of the first integer to obtain the sign of the first integer.

20. The computer system of claim 14, wherein the second integer has a value of zero, and wherein the method further comprises:
- in response to determining that the third value is zero, determining that the first value is equal to the second value.

* * * * *